July 3, 1945.                C. W. LANPHERE                2,379,808
                         AUTOMATIC TRANSMISSION
                    Filed Aug. 24, 1943         2 Sheets-Sheet 1
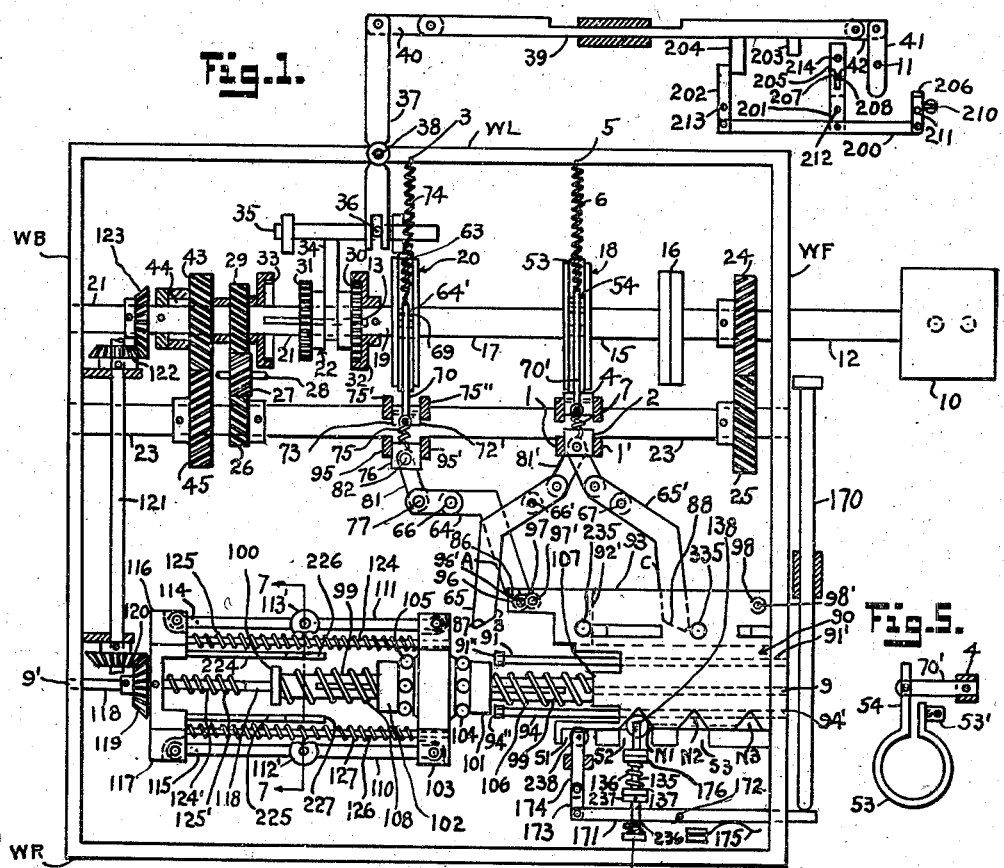
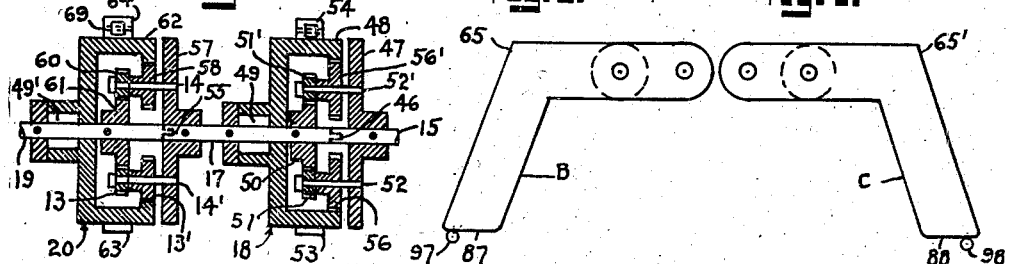
INVENTOR.

Patented July 3, 1945

2,379,808

UNITED STATES PATENT OFFICE 2,379,808

AUTOMATIC TRANSMISSION

Clive W. Lanphere, New York 52, N. Y.

Application August 24, 1943, Serial No. 499,864

18 Claims. (Cl. 74—260)

The present invention (which among other things embodies structures shown in my Patent 2,328,813) relates to a motor car, speed controlled, planetary gear transmission for automatically changing speeds without the use of fluid means, and that assures complete speed changes despite any car lag that may occur in the interval between the release of one speed means and the engagement of another.

One object of the invention is to provide a plurality of planetary gear units that afford a plurality of speeds when these gears function with their brake bands set, and a direct drive, additional speed when the bands are free.

Another object is to provide a plurality of lever means for controlling these gear units.

A further object is to provide movable means for moving into and out of contact with these levers for actuating and releasing them.

A still further object is to provide speed controlled centrifugal means also termed a governor for operating the movable means.

One feature is to provide over-running clutch means for each planetary unit for actuating rotation of the propeller shaft when the planet gears in each unit do not drive this shaft.

Another feature is to provide over-running clutch means that functions oppositely to the over-running clutch means above mentioned, this additional feature connecting the propeller shaft with the engine shaft when the former shaft rotates faster than the latter, as when the car is descending a grade and the engine idling thus affording the use of the engine for holding the car or checking its movement.

The above mentioned and other features will be more fully understood by reference to the drawing in which:

Figure 1 is a diagrammatic plan view of the transmission as seen from above and from the right side with some of the elements shown in cross section to more clearly indicate them. It discloses a motor, a fluid coupling, a main shaft, a counter shaft, planetary means, and other means which will be described in due course. The main and counter shafts are shown in the same plane to better disclose the correlation of the mechanism. In actual construction the counter shaft could be disposed below the main shaft. The elements are shown in first speed position.

Figure 2 is a diagrammatic cross section view of the planetary units.

Figure 3 is a diagrammatic view of a lever.

Figure 4 is a digrammatic view of another lever.

Figure 5 is a diagrammatic rear view of a planetary brake band.

Figure 6 is a diagrammatic right side view of lever actuating means.

Figure 7 is a diagrammatic view of a part of a governor taken on line 7—7 in Figure 1.

Figure 8:
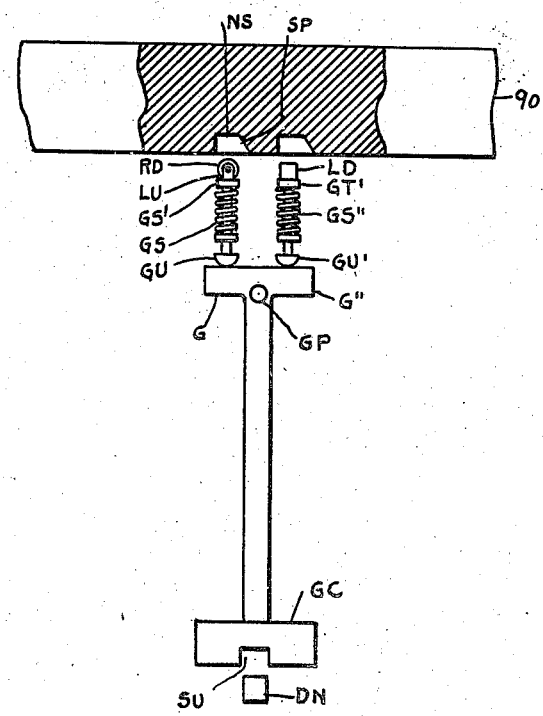
Figure 8 is an enlarged diagrammatic view of a part of Figure 6 wherein member 90 is shown broken away to disclose notches that cooperate with a gradient control also shown.

As the drawings for the most part are diagrammatic, details of supports, bearings, connections and all the structures comprising this invention have not been completely shown, it being understood they can conform to known principles of construction.

Two planetary gear units are shown for two forward speeds and a third speed is obtained when the drum bands are not holding the orbit gears, thus establishing a direct drive, i. e. third speed. Additional planetary units could be incorporated by lengthening the case.

Letters WF, WB, WL and WR identify four walls of a transmission case. A gasoline motor is indicated by reference character 10 and a main shaft comprising several sections by the following characters; 12 marks a section connected to the motor, 15 a section connected to section 12 by a fluid coupling 16; 17 a section connected to section 15 by a planetary gear unit 18; 19 a section connected to section 17 by a planetary gear unit 20; and 21 a section termed a propeller shaft connected to and disconnected from section 18 by a manual sliding clutch 22. This clutch is splined on section 21. Section 21 is supported in section 19 at 13. A countershaft is identified by reference character 23. Section or shaft 12 can carry a gear 24 rotatable with it, and this gear can mesh with another gear 25 secured to shaft 23. Another gear 26 that may be secured to shaft 23 can mesh with a gear 27. The latter gear is rotatable on a shaft 28 and it can mesh with a gear 29 that may be loosely mounted on shaft 21. Clutch 22 can be provided with toothed members 30 and 31. Members 30 can mesh with a toothed member 32 secured to shaft 19, and toothed member 31 with member 33 secured to gear 29. A yoke 34 may be provided for overlapping and actuating clutch 22. This yoke extends from a slidable member 35 this member having a pin 36. An arm 37 rotatable on a fixed support 38 can be utilized for straddling pin 36 for actuating clutch 22. A link 39 may be provided which can be pivotally connected by a link 40 to arm 37 and to a manual lever 41 by a link 42 this lever pivoting on a fixed support 11. When member 30 engages member 32 the device is set for forward (automatic) speed operation. When member 31 engages member 33 it functions in reverse. When clutch 22 is midway between these positions the transmission is in neutral. A gear 43 can be loosely mounted on shaft 21. This gear may be provided with an overrunning clutch in its hub this clutch comprising tapered pockets containing rollers 44. Gear 43 can mesh with a gear 45 secured to shaft 23. This clutch functions oppositely to those in the planetary units and will be described at the proper place.

Figure 2 discloses the construction of the planetary units. Any suitable unit may be used. A specific design will be described. Two units are shown which are designed so they will not drive the propeller shaft 21 faster than the engine shaft 12 rotates. Varying the gear ratios in designing them affords various speeds for driving shaft 21. Shaft 17 can be supported at 46 in shaft 15 and a carrier member 47 may be provided which is secured to shaft 15. An orbit gear 48 may be loosely mounted on shaft 17. Its hub may be provided with tapered pockets containing rollers 49 that roll on the periphery of shaft 17. However this construction can be varied as desired, this type of clutch being well known in the art. Secured to shaft 17 is a sun gear 50 and meshing with this gear are a plurality of planet gears 51 and 51' that can be pivotally mounted on pins 52 and 52' respectively, carried by the carrier member 47 secured to shaft 15. A brake band 53 may be incorporated for cooperation with orbit gear 48. This band may have an offset 54 which can be linked to actuating means and another offset 53' that can be attached to any suitable support (support not shown), see Figure 5. A planet gear 56 can be secured to and rotate with gear 51. A gear 56' and gear 51' can be similarly connected. Or gears 56 and 51 can be disposed on opposite sides of the carrier as can be gears 51' and 56'. Their supporting pins would then rotate in the carrier. Shaft 19 can be supported at 55 in shaft 17. The latter shaft can be provided with a carrier member 57 that is secured to it and rotatable therewith. A pin 14 on it may carry planet gears 58 and 60 and pin 14' can carry gears 13 and 13'. A sun gear 61 can be secured to shaft 19, this gear meshing with planet gears 60 and 13. An orbit gear 62 similar to gear 48 can be loosely mounted on shaft 19. Kear 62 may be provided with tapered pockets in its hub containing rollers 49'. Gears 58 and 13' mesh with gear 62. A band 63 can be provided to cooperate with orbit 62. This band can have an offset 64' which may be linked to its actuating means, and another offset (not shown) similar to offset 53' of band 53 for attachment to any suitable fixed support.

Levers 64, 65, and 65' and suitable linkage can be incorporated for actuating bands 53 and 63. These levers can be pivotally mounted on fixed supports indicated at 66, 66' and 67 respectively. The power arms of levers 64 and 65 overlap each other. Band 63 at 69 on offset 64' is pivotally connected to a link 70 and this link can be pivotally connected at 72' to a member 73 slidable in supports 75' and 75" to which it can be keyed. A light spring 74 connects offset 64' with the case wall WL at 3. A stiff spring 75 connects member 73 with another slidable member 76 keyed to and slidable in supports 95 and 95'. A link 81 pivotally connects member 76 at 82 with lever 64 at 77. Lever 65 is connected by a link 81' to a movable member 2 slidable in supports 1 and 1', and member 2 is connected by a stiff spring 7 to a slidable member 4. A link 70' pivotally connects member 4 with offset 54 and a light spring 6 connects this offset with the wall WL at 5.

The actuating means for these levers will now be described. A floating member 90 slidable on rods 91 and 94 that can be supported in the case wall WF at 91' and 94' and in supports 91" and 94" respectively can be utilized. Member 90 may be provided with offsets 92, 92 and 93 that carry rollers 96, 97, and 98 mounted on pins 96', 97', and 98'. See Figures 1 and 6. A cylindrical rod 99 can extend from the member 90, and it may terminate in an offset 100 that can be suitably attached to it. Slidably mounted on and keyed to rod 99 are disc shaped collars 101 and 102 and between these collars may be disposed a collar 103 rotatable on rod 99. Thrust ball bearings between this collar and collars 101 and 102 are indicated at 104 and 105 respectively. These bearings can be of any suitable type. A spring 106 may be disposed on member 99 between collar 101 and a shoulder 107 on member 90, and a similar spring 108 can be positioned between collar 102 and offset 100. Pivotally connected to collar 103 are links 110 and 111. These links form part of a governor or centrifugal means. Link 110 can be pivotally connected to weights 112 and 112'. Link 111 may be pivotally connected to weights 113 and 113'. Two other links 114 and 115 may be pivotally connected to these weights. Link 114 has a finger end 114' disposed between a forked end 111' and 111" of link 111. Link 115 has a finger end 115' positioned between a bifurcated end 110' and 110" of link 110. See Figure 7. Figure 1 shows only two of the governor weights and they are broken away, due to the lack of space in so small a drawing. Links 114 and 115 may be pivotally connected to portions 116 and 117 respectively of a disc shaped support attached to and rotatable with a shaft 118. Gears 119 and 120 connect this shaft with a shaft 121 which in turn is connected to the propeller shaft 21 by gears 122 and 123. Shaft 118 can be disposed with the necesary clearance in a bore in member 90. It can be supported in the case walls WF and WB at 9 and 9' respectively. Portion 116 may support one end of an arm 124 and portion 117 may have an arm 126 projecting from it. Two other arms 124' and 126' can extend from the disc that carries arms 124 and 126. These four arms can terminate at the center of collar 103 in a series of holes therein, with clearance enough to permit collar 103 to slide along these arms. In Figure 1 only a part of arm 124' is shown and none of arm 126'. Springs 125 and 127 of the helical type can be mounted on arms 124 and 126 respectively. Helical springs 125' and 127' can be mounted on arms 124' and 126' but they are to be shorter than springs 125 and 127 and can be attached to the disc from which these arms project. Springs 125 and 127 oppose collar 103 in the speed changes between first and second speeds and all four springs oppose collar 103 in changes between second and third speed. Four other arms 224, 225, 226 and 227 extend from the disc shaped member. See Figures 1 and 7. These arms act as stops or blocks for collar 103 when at third speed position. They prevent the governor exerting any pressure on spring 108 at speeds above that required to actuate shifts to third speed. Arms 224 and 225 are shown broken away in Figure 1. Should it be desirable lateral supports (not shown) for the governor pivotal arms 110, 111, 114 and 115 could be provided to extend from any suitable part of the governor. Altho a specific design of governor is disclosed, any suitable type may be used. A plunger 135 may be incorporated for holding member 90 at the various speed positions. It may be provided with a roller 136 for engaging notches N1, N2 and N3. Two springs can be used for urging this plunger into them. One spring identified by reference characters 136 may be disposed between a stop or support 137 and an offset 176 on the plunger, and can be designed to oppose the plunger during its entire retractive movement. Another spring marked 236 may be positioned between a flange 237 on the plunger and a stop 238 to which it can be attached; this spring being designed to oppose the retraction of the plunger during the latter part of its movement.

Spring 236 adds to the holding action of plunger 135 on member 90 in order to maintain the requisite pressure just prior to the disengagement of roller 136 from a notch, the sloping surface of which at this time affords an urge in a direction nearer to the line of direction of the retractive movement of the plunger which renders less effective the urge of the plunger springs. Spring 236 makes it possible to use less maximum pressure in spring 136, thereby affording less variation in the holding of member 90 which permits a lower maximum and more desirable compression in springs 106 and 108.

When the car is assembled the elements are functionally positioned as shown in Figure 1. The roller 96 on floating member 90 holds lever 64 in first speed position which causes the brake band 63 to hold orbit gear 62 preventing its rotation. The mathematical proportions here given for some of the elements are not necessarily specific but they are used to better show how the device functions. Each power arm of levers 64, 65, and 65' is about three times the length of the weight arm of the levers. The latter arm moves $\frac{3}{32}$" and members 2 and 76 move $\frac{1}{4}$". On this basis a pull of 32 lbs. by the weight arm will exert 36 lbs. pressure on a brake band, and a pressure of 11 lbs. on a lever at the point a roller on member 90 contacts it will actuate the lever. In practice a pull much less than 11 lbs. actuates the member 90. Roller 96 contacts surface 86, roller 97 contacts surface 87, and roller 98 contacts surface 88. See Figures 1, 3 and 4. In presenting relative spring pressure here, 11 lbs. is the figure considered necessary to actuate a lever. Springs 7 and 75 are each designed to withstand a pressure of approximately 34 lbs. before yielding and to exert a pressure of 35 lbs. on a band when 36 lbs. pressure is applied to either of these springs, by members 76 or 2 as the case may be. The long end of the levers moves about $\frac{3}{4}$" and as previously stated the short end moves $\frac{3}{32}$". The springs 74 and 6 merely exert a slight pull on their respective cooperating brake bands when they are released. If it is advisable to increase the band pressures this can be done by increasing all the spring pressures proportionately. Lever 64 controls planetary unit 20 and is actuated by roller 96, roller 97 actuates lever 65 and roller 98 operates lever 65', the latter two levers controlling planetary unit 18. Levers 65 and 65' are exact opposites in form and of the same proportions. Roller 97 actuates lever 65 in progressive shifts and roller 98 actuates lever 65' in regressive shifts.

In each shift the collar 103 moves 2". When the shift is advancing the centrifugal force actuates it and when regressing the governor springs operate it. This compresses either spring 108 or 106 as the case may be 2", each spring when compressed 2" being designed to exert 33 lbs. pressure.

Member 90 moves 2" in each shift, a distance equal to the compression movement of springs 106 and 108. Its notches N1, N2, and N3 are one inch wide at the point roller 136 leaves them, and 2" from center to center. Member 90 moves $\frac{1}{2}$" when roller 136 travels over one of the sloping surfaces of its cooperating notch during the initial movement of member 90, the particular surface depending on the direction of movement. During this $\frac{1}{2}$" movement any roller that is holding a lever in gear speed position simply rolls from gear position on the surface it is in contact with to the angle at which it leaves this surface, and any roller that is to next actuate a lever moves into contact with one of the surfaces A, B or C as the case may be but does not actuate the lever at this time. Therefore no speed change occurs during the release of member 90. When it is released its movement is at first rapid but as the particular roller on member 90 that next actuates a lever is in contact with this lever no noise results from the rapid movement. As previously mentioned springs 106 and 108 are under 33 lbs. pressure (when member 90 is released) due to the 2" compression of these springs caused by the movement of collar 103 and either collar 101 or 102 as the case may be. Springs 136 and 236 of plunger 135 are to be designed to exert a pressure against member 90 that requires a push or pull of 33 lbs. on this member to release it when roller 136 leaves a notch in it. During the last half inch movement of member 90 in its shift the rollers 96, 97, or 98 merely roll on one of the respective surfaces 86, 87 or 88 as the case may be, the respective lever for the particular surface simply being held in gear functioning position after its actuation to this position. As previously stated member 90 and its rollers move a total of 2" in each shift. When member 90 is released with one of the springs 106 or 108 under 33 lbs. compression this member has moved one half inch. From this point of release to the point a roller impinges on one of the surfaces 86, 87, or 88 is one inch. From the position of release of member 90 by plunger 135 (the position of maximum compression of springs 106 or 108) to the final resting position of a roller on a lever, member 90 travels one and one half inches. So when a roller reaches the lever, a distance of one inch as above stated, member 90 has travelled two thirds of its total travel from maximum compression to no compression. Therefore two thirds of its compression is gone but one third remains which is $\frac{1}{3}$ of 33 lbs., 11 lbs. Roller 136 entering a notch and rolling over its sloping surface also impels member 90 in its movement. This is ample to urge member 90 to gear position and thereby actuate a lever and therewith set a brake band. Figures 3 and 4 indicate the points at which rollers 97 and 98 hold levers 65 and 65' respectively at gear speed position. To prevent any possible interference with progressive shifts by the governor tending to slow down on grades during the momentary interval of change from one speed position to another the following means can be provided. A second plunger indicated at 235 in Figures 1 and 6, similar to plunger 135 can be positioned to oppose a sloping surface N1' on member 90 in the shift from first to second speed. This plunger may have springs (springs not shown) that require an additional pull by the governor on collar 103 to release member 90. As previously stated this member moves one half inch during this release. Springs 125 and 127 are designed to oppose collar 103 with a predetermined pressure for each half inch movement of this collar when it is actuated by the governor. Thus the additional pull required by plunger 235 before member 90 is released builds up a potention force that will carry the governor 2½" instead of 2" when plungers 135 and 235 release member 90. This release occurs at about 14 mile car speed instead of 12 which would be the case without plunger 235 being incorporated. Thus a car lag of 2 miles per hour during speed changes can not prevent a complete shift occurring as collar 103 will be sure to move its normal 2", even if the governor does slow down in rotation, as the potential centrifugal force will assure this. Should there be no car lag as on level ground the collar 103 would move 2½" but member 90 would not as plunger 135 would be in notch N1 exerting 33 lbs. resistance to the extra pull by the governer necessitated by plunger 235. The plunger 235 does not oppose the movement of member 90 in the regressive shifts. As in the shift from first to second, springs 125, 127 in the shift from second to third offer the same resistance to each half inch movement of collar 103. The springs 125' and 127' on rods 124' and 126' offer additional resistance for this distance to offset the increased centrifugal force. A third plunger 335 may be employed for opposing a sloping surface N2' on member 90 to necessitate an extra pull by the governor similar to the action of plunger 235. The second to third shift occurs at an assumed speed of about 22 miles instead of about 20 as would occur without the incorporation of plunger 335. Car lag can not interfere with regressive shifts. Arms 224, 225, 226 and 227 prevent collar 103 moving beyond third speed position in the shift from second to third whether there is car lag or not.

With the elements in first speed position as shown in Figure 1 and the motor idling, no actuation of shafts 15, 17, 19 and 21 occurs due to the slippage in the fluid coupling 16. This coupling may be of any suitable design. The governor springs 125, 127 at this time are under a compression of more than 33 lbs. which is required to compress spring 106 and to offset the centrifugal force in the shift from second to first gear which will be detailed at the proper place. Simultaneously, gear 24 rotates clockwise causing gear 25 to turn counterclockwise and therewith shaft 23 and gear 26. The latter gear actuates gear 27 clockwise which in turn rotates gear 29 counterclockwise. As clutch 22 is not engaging member 33 of gear 29 no actuation of shaft 21 takes place. Although shaft 23 rotates gear 45 which in turn rotates gear 43 no effect is produced on shaft 21 because the rollers 44 are in the wide part of their containing pockets in the hub of gear 43. Only when shaft 21 rotates faster than shaft 19 and shaft 12 is there any functional connection between shaft 21 and the engine, this connection being due to the rollers 44 being disposed in the narrow part of their cooperating pockets, which locks shaft 21 to gear 43, affording a positive means for starting the motor by movement of the car forwardly, or for using the engine as a brake to hold the car i. e. check its motion.

If desirable the fluid coupling 16 could be placed between gear 24 and the motor 10. This would allow some car coasting before the engine acted as a brake.

An over-drive unit (not shown) well known in the art could be positioned to the rear of the transmission thus affording a fourth speed, with the propeller shaft 21 rotating faster than shaft 19 and the engine shaft 12.

Longer movement of the planetary brake bands can be obtained by lengthening the short ends of the levers 64, 65, 65'. In this case either the long ends of the levers would have to be lengthened or the pressure for actuating them increased, the later requiring no additional movement of the levers by the rollers on member 90.

Re the planetary gear units the double planet gears on each carrying pin afford ample range to design them for the various speeds.

*Operation*

With the transmission in first speed position and the motor speeded up sufficiently, the fluid coupling 16 drives the shaft 15 clockwise and therewith carrier member 47. As the sun gear 50 is under a load the planet gears 51, 56, 51' and 56' rotate clockwise on their respective pins 52 and 52'. As orbit gear 48 is free from band 53 this gear idles a short distance actuated by the planet gears 56 and 56' until the narrow part of the hub pockets in gear 48 bind on rollers 49. This forms a positive connection between shaft 15 and shaft 17, causing the latter shaft and carrier member 57 to rotate clockwise. As the brake band 63 holds orbit gear 62 in fixed position the planet gears 58 and 13' travel around the inside of it causing them to rotate counter clockwise which actuates the sun gear 61 clockwise. This drives shaft 19 clockwise in first speed in accordance with the gear ratios of planetary unit 20. When band 63 is released and band 53 holds drum 48, the release of band 63 allows planetary unit 20 to function similarly to unit 18 just described and the gripping of band 53 holds drum (orbit gear) 48 in fixed position resulting in its planet gears 56 and 56' traveling around its interior teeth causing the sun gear 50 to rotate shaft 17 clockwise in second gear in accordance with the gear ratios of unit 18. When both bands are free a direct drive results thus affording a third speed.

The first to second gear change occurs at a predetermined speed with the governor collar 103 at second speed position with an effective centrifugal force that exceeds by 33 lbs. the combined pressures of springs 125 and 127 thus placing spring 108 under 33 lbs. compression causing the release of member 90 and its actuation to second gear position.

The second to third gear change occurs at a predetermined speed with the governor collar 103 at third speed position and an effective centrifgual force that exceeds by 33 lbs. the combined pressure of springs 125, 127, 125' and 127', causing actuation of member 90 to third gear position.

The third to second gear change occurs at much less speed than that of the change from second to third gear. The combined pressures of springs 125 and 127 (not springs 125' and 127'), exceed the effective centrifugal force by 33 lbs., causing actuation of member 90 to second gear position.

The second to first gear change occurs at considerably less speed than that of the first to second gear change. The combined pressures of springs 125 and 127 exceed the effective centrifugal force by 33 lbs., thus actuating member 90 to first gear position.

Alternative constructions

The gradient control GC and cooperating elements shown in my Patent 2,251,257 could be incorporated to control member 90 on grades in place of the plungers 235 and 335. (See Figure 8.)

This control for practical purposes must be perpendicularly disposed. In addition to the pendulum GC pivoted at GP two dogs LU and LD may be utilized to cooperate with member 90. When the car is ascending a grade the pendulum at its lower end swings to the left as viewed and its upper end to the right. An arm G of element GC moves into contact with a curved surface GU on dog LU actuating this dog in opposition to its spring GS which is compressed against a stop GS'. A roller RD suitably pivoted on dog LU moves into contact with a sloping surface SP of a notch NS. Obviously member 90 can have a plurality of these notches. By properly designing these parts the member 90 can be delayed in its progressive shifts in proportion to the degree of the grade. When the car is descending a grade of predetermined degree the member GC will swing to the right at its lower end and to the left at its upper end. An arm G" on pendulum GC will contact a curved surface GU' on dog LD actuating this dog in opposition to its spring GS" which compresses it against a stop GT", the dog entering a notch. Due to the straight side of the notch the dog positively prevents regressive shifts of member 90 while a car is descending a predetermined grade. The pendulum GC can be provided with a notch SU adapted to receive a dog DN which can be actuated by suitable linkage (linkage not shown) operable from the dash.

A conventional clutch could be substituted for the fluid coupling 16. This would require manual operation when the car stops as is the practice with conventional transmissions.

If desirable, gear 43 could be designed to rotate a little faster than shaft 21 in direct drive.

Special controls

For holding the transmission in any particular gear a foot pedal 170 placed near the driver's left foot could be incorporated to actuate a lever 171 pivoted on a fixed support 172. A link 173 may connect this lever to a lock bar 174 carrying a roller 238. Actuation of pedal 170 moves this bar into one of a series of notches S1, S2, and S3 in member 90, each notch corresponding with a gear speed. When the pedal is released a spring 175 causes lever 171 to retract the bar 174.

Should it be desirable the following automatic means can be used for placing the transmission in neutral when starting the motor. A pedal 206 of the lever type can be suitably pivoted on a fixed support 211. This lever may be provided with a roller 210 for actuating the engine starter plunger (starter plunger not shown). A link 200 can be pivotally connected to pedal 206. A lever 201 pivoted on a fixed support 212 may be pivotally connected to link 200. This lever may be provided with a forked end 207 for straddling a pin 208 on another lever 205. Lever 205 can be pivoted on any suitable fixed support 214. Another lever 202 pivoted on a fixed support 213 may be pivotally connected to member 200. With clutch 22 at the position shown in Figure 1, an offset 204 on link 39 is in contact with lever 202. Actuation of the lever 206 would cause lever 202 to move offset 204 and link 39 to the right as viewed thus disengaging member 30 from member 32. With clutch 22 in reverse position, an offset 203 on link 39 is in contact with lever 205. Actuation of lever 206 would cause lever 205 to move offset 203 and link 39 to the left as viewed thus disengaging member 31 from member 33.

Car parking

With a car parked facing down grade and the transmission set in first gear and should the car move forwardly the motor 10 will stop it as the over-running clutch in gear 43 will take hold.

Should the car face up grade the motor will not stop its backward movement due to the slippage in the fluid coupling 16. Setting the clutch 22 in reverse gear will hold the car against any car movement.

From the foregoing it will be seen that while a preferred embodiment of this invention has been disclosed, it is not desired to restrict the details to the exact construction shown, it being obvious that changes not involving invention may be made without conflicting with the spirit of the invention and the scope of the claims.

What I claim is:

1. In a mechanism, a single planetary means including in combination a carrier means, planet gears thereon, and an orbit gear cooperating with said planet gears, a plurality of lever means having fixed pivotal points for controlling said single planetary means, and a single means movable into and out of contact with said lever means for actuating said means.

2. In a speed changing mechanism, a plurality of planetary speed changing means, a plurality of braking means for controlling said speed changing means, a plurality of yielding means for actuating said second mentioned means to braking position, means for actuating said yielding means, a plurality of lever means for actuating said fourth mentioned means, a plurality of movable means for actuating said lever means, a single movable means for actuating said plurality of movable means, yielding means for actuating said single movable means in a plurality of directions, and actuating means for said yielding means.

3. In a speed changing mechanism, speed changing means, means for controlling said speed changing means, said second mentioned means including in combination yielding means, lever means for actuating said second mentioned means, movable means for actuating said lever means, movable means for actuating said first mentioned movable means, yielding means for actuating said second mentioned movable means, and speed controlled actuating means for said yielding means.

4. In a speed changing mechanism, a plurality of planetary speed changing means, a plurality of lever means for controlling said speed changing means, a plurality of movable means for actuating said lever means, a single movable means for operating said plurality of movable means, a plurality of yielding means for actuating said single movable means in a plurality of directions, and speed controlled actuating means for said yielding means.

5. In a speed changing mechanism, a plurality of planetary speed changing means, a plurality of lever means for controlling said planetary speed changing means, a plurality of pivotal means for actuating said lever means, a single movable means for carrying said plurality of pivotal means, a plurality of yielding means for actuating said single movable means in a plurality of directions, and centrifugal means for operating said yielding means.

6. In a speed changing mechanism, a plurality of speed changing means, a plurality of lever means for controlling said speed changing means, a plurality of means adapted to turn in a plurality of directions for actuating said lever means, a single movable means for carrying said third mentioned means, a plurality of yielding means for operating said single movable means, and speed controlled actuating means for said yielding means.

7. In a speed changing mechanism, speed changing means, lever means for controlling said speed changing means, said lever means being technically termed first class, actuating means movable into and out of contact with said lever means for actuating said lever means, a single carrying means for said actuating means, and a plurality of yielding means for actuating said carrying means.

8. In a speed changing mechanism, speed changing means, lever means for controlling said speed changing means, a plurality of means for actuating said lever means, a single carrying means for said plurality of means, and actuating means for said carrying means, said plurality of means disposed on opposite sides of a line corresponding with the direction of movement of said carrying means.

9. In a mechanism, movable means, a single holding means for said movable means, said holding means including in combination a movable means, resilient means for actuating said second mentioned movable means in its entire movement to holding position, and additional resilient means for actuating said second mentioned movable means in only part of said movement.

10. In a mechanism, speed changing means, a plurality of lever means for controlling said speed changing means, said lever means having a plurality of arms, some of said arms overlapping each other, and a single movable means for actuating said plurality of lever means.

11. In a mechanism, driving means, a plurality of driven means, a plurality of speed controlled means for controlling said plurality of driven means, fluid means for functionally connecting and for affording slippage between said driving means and said driven means, said driven means including in combination a plurality of shafts disposed in axial alignment and operable in sequence, over-running clutch means functionally positioned between said driving means and the shaft last operable in said sequence, said clutch means being functionally independent of the shafts that function before the last shaft in said sequence functions, said over-running clutch means affording free movement and a positive connection between said driving means and said driven means.

12. In a transmission, driving means, a plurality of members forming a train of driven means operable in sequence, including planetary means, means for connecting said driving means and said train of driven means, additional means including in combination over-running clutch means, said clutch means being functionally independent of the driven means that function before the last driven means in said sequence functions, said additional means adapted to form a positive connection between said driving means and the driven means last operable in said sequence when said driving means rotates slower than said last above mentioned driven means and to afford a free movement between said driving means and said just above mentioned driven means when said driving means rotates faster than said driven means, reciprocating means for controlling said planetary means, and speed controlled means for controlling said reciprocating means.

13. In a transmission mechanism, transmission means including in combination carrier means, planet gears thereon, and orbit gears, a plurality of levers for controlling said orbit gears, each of said levers having its fulcrum disposed between its weight arm and its power arm, pivotal means for actuating said levers, movable means having a plurality of offset means for supporting said pivotal means, said pivotal means disposed between said plurality of offset means and turnable without turning movement of said last above mentioned means, and actuating means for said movable means.

14. In a speed controlled speed changing mechanism, speed changing means, including in combination carrier means, planet gears thereon, and an orbit gear, and actuating means for said speed changing means, said speed changing means including in combination a plurality of over-running clutch means adapted to function in a similar manner, and another over-running clutch means adapted to function in a manner opposite to said first-mentioned clutch means.

15. In a transmission mechanism, a single planetary means, a brake band for controlling said planetary means, a lever of the first class connected to and adapted to set said band, an additional lever of the same class connected to and adapted to set said band, a single movable means having means for actuating said first mentioned lever to band setting position when said movable means travels in one direction, and for actuating said additional lever to band setting position when said movable means travels in another direction, and actuating means for said movable means, the connection of both of said levers to said brake band causing them to move simultaneously when either lever is actuated by said single movable means.

16. In a speed changing mechanism, a single speed changing means, control means therefor, a lever having its fulcrum disposed between its weight arm and its power arm, connecting means for said lever and said control means, said lever and said connecting means adapted to actuate said control means, an additional lever having its fulcrum disposed between its weight arm and its power arm, additional connecting means for said additional lever and said control means, said additional lever and said additional connecting means adapted to actuate said control means, and a single movable means possessing means for actuating both of said levers, said movable means when traveling in one direction adapted to actuate said first mentioned lever and therewith the first mentioned connecting means thereby exerting a specific action on said control means, and when travelling in another direction adapted to actuate said additional lever and therewith said additional connecting means thereby exerting a similar effect on said control means, both of said levers moving simultaneously when either lever is actuated by said single movable means.

17. In a speed changing mechanism, speed changing means including in combination a plurality of lever means for controlling said speed changing means, a single movable means movable into and out of contact with and for actuating said lever means to actuated position or for releasing said lever means, said movable means having a plurality of notches corresponding to said lever actuated positions, a notch for each position, and holding means for engaging said notches, said holding means adapted to leave one of said notches at the time said movable means releases one of said lever means, and to enter another of said notches at the time said movable means actuates another of said lever means to actuated position.

18. In a mechanism, driving means, a plurality of driven means, a plurality of speed controlled means for controlling said plurality of driven means, fluid means for functionally connecting and for affording slippage between said driving means and said driven means, said driven means including in combination a plurality of rotatable means disposed in axial alignment and adapted to function in sequence, over-running clutch means functionally positioned between said driving means and the last rotatable means adapted to function in said sequence, said over-running clutch means being functionally independent of the rotatable means that function before the last rotatable means in said sequence functions, said over-running clutch means affording free movement and a positive connection between said driving means and said last rotatable means.

CLIVE W. LANPHERE.